(12) United States Patent
Johnson

(10) Patent No.: US 12,251,911 B1
(45) Date of Patent: *Mar. 18, 2025

(54) SOUND REDUCING PANEL

(71) Applicant: L.J. Avalon, LLC., Tampa, FL (US)

(72) Inventor: Lahnie Johnson, Tampa, FL (US)

(73) Assignee: LJ AVALON LLC, Tampa, FL (US)

( * ) Notice: Subject to any disclaimer, the term of this patent is extended or adjusted under 35 U.S.C. 154(b) by 105 days.

This patent is subject to a terminal disclaimer.

(21) Appl. No.: 18/206,007

(22) Filed: Jun. 5, 2023

Related U.S. Application Data

(60) Division of application No. 17/099,693, filed on Nov. 16, 2020, now Pat. No. 11,707,926, and a continuation-in-part of application No. 15/801,414, filed on Nov. 2, 2017, now Pat. No. 10,839,784.

(60) Provisional application No. 62/416,790, filed on Nov. 3, 2016.

(51) Int. Cl.
| | |
|---|---|
| *B32B 27/36* | (2006.01) |
| *B32B 27/06* | (2006.01) |
| *B32B 33/00* | (2006.01) |
| *E04B 1/86* | (2006.01) |

(52) U.S. Cl.
CPC ............ *B32B 27/36* (2013.01); *B32B 27/065* (2013.01); *B32B 33/00* (2013.01); *E04B 1/86* (2013.01); *B32B 2307/102* (2013.01); *B32B 2307/304* (2013.01); *B32B 2307/3065* (2013.01); *B32B 2307/71* (2013.01); *B32B 2307/7265* (2013.01); *B32B 2367/00* (2013.01)

(58) Field of Classification Search
CPC ... E04B 1/86; E04B 2001/8452; B32B 27/36; B32B 2307/102; B32B 2307/304; B32B 2307/3065; B32B 2307/71; B32B 2307/7265

See application file for complete search history.

(56) References Cited

U.S. PATENT DOCUMENTS

| | | | | |
|---|---|---|---|---|
| 4,248,325 A | * | 2/1981 | Georgopoulos | B32B 7/12 181/290 |
| 4,330,046 A | * | 5/1982 | Lerner | E04B 1/86 181/291 |
| 4,428,454 A | * | 1/1984 | Capaul | E04B 1/86 181/290 |
| 6,158,176 A | * | 12/2000 | Perdue | E04B 1/86 181/291 |
| 6,598,358 B1 | * | 7/2003 | Schwertfeger | G10K 11/162 181/290 |
| 7,063,184 B1 | * | 6/2006 | Johnson | G10K 11/162 181/290 |

(Continued)

*Primary Examiner* — Jeremy A Luks
(74) *Attorney, Agent, or Firm* — Frijouf, Rust & Pyle P.A.

(57) ABSTRACT

An improved sound reducing panel is disclosed comprising a front porous sheet for enabling sound to enter into the sound reducing panel and a rear non-porous sheet. A sound absorbing member dissipates sound entering into the front porous sheet. A sound blocking member blocks sound from exiting from the sound absorbing member. A decoupling member reduces sonic vibration from being transferred from the sound blocking member to the rear non-porous sheet. One embodiment includes a drenching shield for inhibiting water from entering the sound absorbing member. Another embodiment includes a decorative or artistic image located on the sound reducing panel.

6 Claims, 16 Drawing Sheets

(56) References Cited

U.S. PATENT DOCUMENTS

| | | | |
|---|---|---|---|
| 7,503,428 B1 * | 3/2009 | Johnson | E04B 9/0485 |
| | | | 181/290 |
| 8,739,924 B2 * | 6/2014 | Johnson | E04B 9/0428 |
| | | | 181/290 |
| 10,839,784 B1 * | 11/2020 | Johnson | B32B 15/082 |
| 11,707,926 B1 * | 7/2023 | Johnson | B32B 27/36 |
| | | | 181/290 |
| 2010/0006372 A1 * | 1/2010 | Bischoff | B60R 13/083 |
| | | | 181/290 |
| 2010/0243369 A1 * | 9/2010 | Fusiek | E01F 8/007 |
| | | | 181/210 |
| 2014/0262603 A1 * | 9/2014 | Johnson | E01F 8/0017 |
| | | | 181/211 |
| 2017/0243573 A1 * | 8/2017 | Gentile | B60R 13/083 |

* cited by examiner

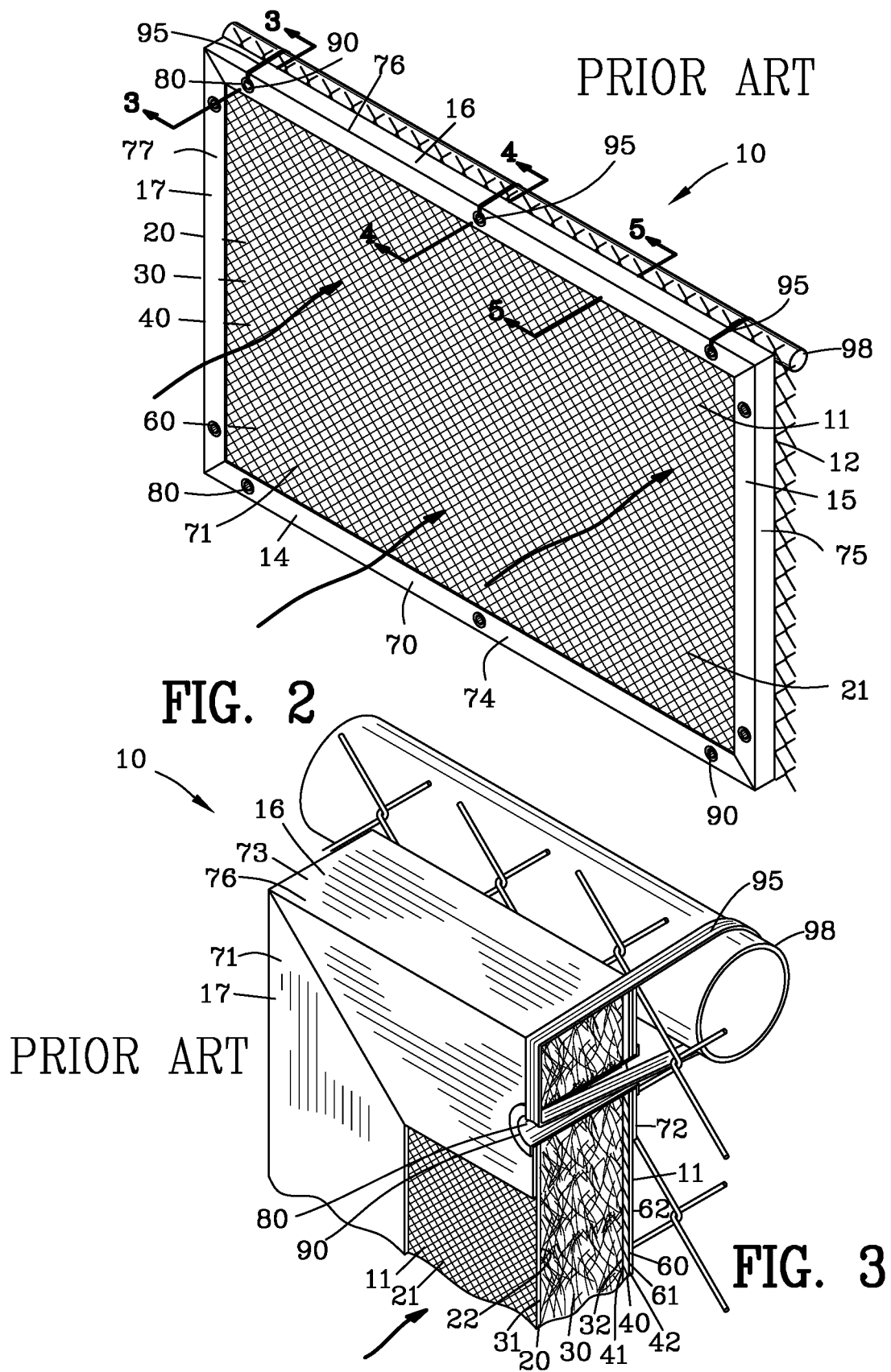

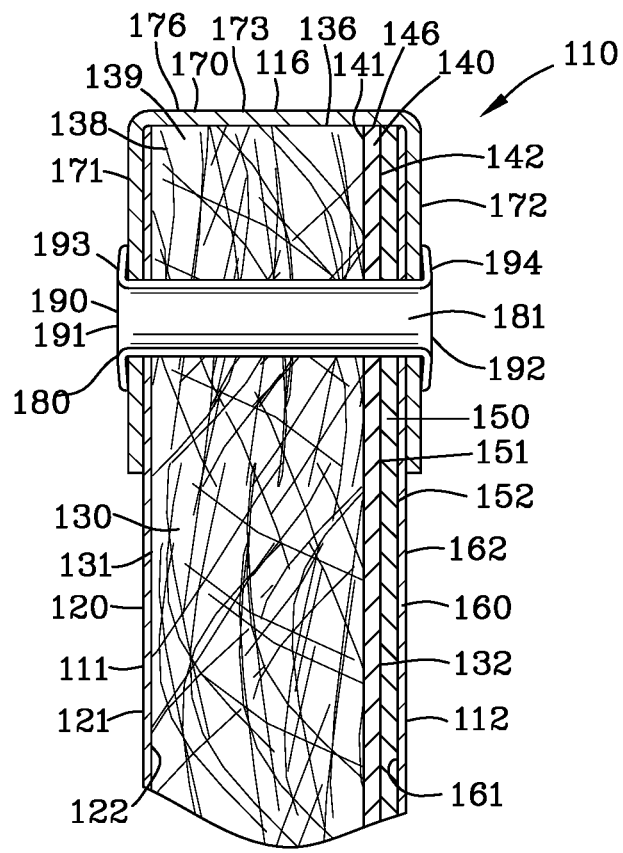
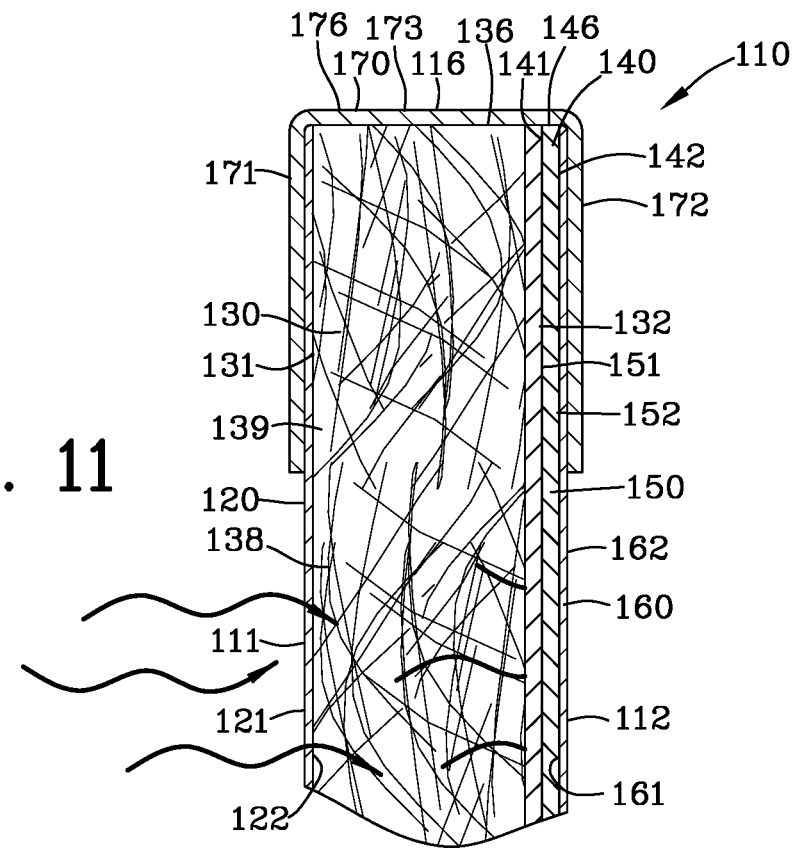

SOUND REDUCING PANEL

BACKGROUND OF THE INVENTION

Field of the Invention

This invention relates to sound reduction and more particularly to an improved sound reduction panel suitable for use in an indoor, outdoor and/or a hostile environment.

Description of the Related Art

The prior art has known various types of devices and methods for reducing the level of sound within an environment. The various types of devices and methods of the prior art for reducing the level of sound within an environment included a diverse and variety of apparatuses and methods adapted for many as specific applications and uses.

One particular type of device for reducing the level of sound within an environment comprises the use of sound reducing panels and/or sound absorbing devices. Various types of sound reducing panels and sound absorbing devices have been incorporated by the prior art to reduce the level of sound and/or to selectively reduce or inhibit reflection of sound from reflective surfaces within an environment.

In some instances, the apparatuses and methods for reducing the level of sound within an environment selectively reduced the level of sound within an environment. Many of the apparatuses and methods for reducing the level of sound within an environment were specifically designed for providing enhancements for improving the acoustics within the environment, sound reducing panels and sound absorbing devices have been employed in very large rooms such as auditoriums as well as smaller rooms such as recording studios, home theaters and the like.

Other apparatuses and methods for reducing the level of sound within an environment of the prior art reduce the overall level of acoustic noise and/or sound and/or noise within the environment. In many cases, sound absorbing apparatuses and methods were used to reduce the sound of operating machinery as well as being used for reducing the transmission of sound and/or noise between the adjacent walls of a building.

The following U.S. Patents are representative of the attempts of the prior art to provide apparatuses and devices for reducing sound within an environment.

U.S. Pat. No. 2,495,636 to O. R. Hoeltzel et al. discloses a unit comprising a layer of loosely matted mass of fibrous material. A substantially impervious preformed and film of thermoplastic synthetic resin material is integralized with the fibers in one face of the loosely matted material. A fabric covering on the other face of the loosely matted layer is enfolded and is secured about the edges of the mass and the film. The mass, film and fabric are in the form of the sound proof flexible panel adapted to cover and soundproof a section of a wall.

U.S. Pat. No. 2,497,912 to W. M. Rees discloses an acoustic construction for the walls and ceilings of an enclosure comprising a sound absorbing layer overlying the wall and formed by a plurality of rectangles or tiles of fibrous material arranged in a plane. The edge of each of the tiles are contiguous to and slightly spaced from the edges of adjoining tiles. A renewable facing for the sound absorbing layer includes a plurality of thin sheets of porous material individual to the tiles. Each of the sheets having tabs at its edges integral with the sheets and resiliently held in place between adjacent edges of the tiles to hold the sheets in place over the face of the tiles.

U.S. Pat. No. 2,553,363 to C. C. Droeger discloses a non-combustible wall or ceiling of a plurality of parallel, latterly spaced, non-combustible primary furrings anchored thereon. Sound absorbent pads are arranged between adjacent pairs of furrings. A plurality of spaced, non-combustible secondary furrings extend extended transversely across the primary furrings and are secured thereto. Each of the secondary furrings comprise a portion lying in a plane parallel with the wall or ceiling and bridging between primary furrings and are provided with a multiplicity of perforations adapted to threadably receive threaded shanks of screws. A multi-perforate finish sheaths overlies the aforesaid parts.

U.S. Pat. No. 2,694,025 to G. Slayter et al. discloses a structural board comprising a core of glass fibers bounded into a porous self-sufficient layer. A layer of substantially inorganic cementitious material is integrated with at least one of the faces of the core. The cementitious layer is formed of a composition consisting essentially of an amide-aldehyde resin selected from the group consisting of urea formaldehyde and melamine formaldehyde and gypsum cement.

U.S. Pat. No. 2,923,372 to M. Maccafeni discloses an all plastic acoustic tile formed of a molded plastic material comprising a plate-like body having a rearwardly extending edge flange thereabout integral therewith. The body is formed to provide the front side thereof as a flat, planar face and having a multiplicity of apertures therethrough from the front face to and opening through the rear side all the body. Sound wave dampening tubes are molded integrally with the body projecting rearwardly from the rear side thereof. Each of the dampening tubes has a passage therethrough opening at the rear end thereof. Each of the dampening tubes is located on the rear side of the body in position with a body aperture opening into and forming the inlet to the passage of the dampening tube. The body has the rear side thereof formed with an annular recess therein about each of the dampening tubes providing a reduced thickness base portion of the body with which the tube is integrally joined.

U.S. Pat. No. 3,136,397 to O. C. Eckel discloses an assembly with two angular adjoining walls and a ceiling. The assembly comprises a plurality of panels with a first of the panels extending along the ceiling from the first wall. A second of the panels extends along the first wall below the ceiling panel. A Z-shaped retainer embodying one angular portion is attached to the first wall. Another angular portion extends laterally away from the wall indirectly below the first ceiling panel and above the second panel. And a third angular portion extends downwardly away from the ceiling panel. The ceiling first panel rests on the other angular portion of the retainer.

U.S. Pat. No. 3,949,827 to Witherspoon discloses an acoustical panel assembly having improved structural, decorative and acoustical properties. The panel assembly includes a perimeter frame. A thin septum member is supported in the center of the frame. A fibrous glass layer is positioned adjacent each side of the septum member. A molded, semi-rigid, fibrous glass diffuser member is positioned adjacent each of the fibrous glass layers. The assembly includes means for joining adjacent panel assemblies and, in one embodiment, an outer decorative fabric layer is positioned adjacent each of the outer surfaces of the diff-user members.

U.S. Pat. No. 3,967,693 to Okawa discloses a means and method for diminishing energy of sound. A corrugated cover having holes therethrough is mounted on a wall by ribs and an edge plate. The wall and edge plate together with the ribs and corrugated cover form a plurality of chambers, each cooperating with a plurality of the holes for diminishing the energy of impinging sound waves.

U.S. Pat. No. 4,113,053 to Matsumoto et al. discloses a sound absorbing body which can effectively be utilized as an exterior sound absorbing wall or an interior wall of a house. The sound absorbing body comprises a number of sound absorbing cavities inclined at an angle alpha which is smaller than 80 degrees with respect to a transverse horizontal sectional plane of the body. The sound absorbing cavities are opened at the sound incident surface.

U.S. Pat. No. 4,160,491 to Matsumoto et al. discloses a perlite sound absorbing plate and a sound insulating wall constructed by arranging a number of the plates side by side and by assembling together into one integral body. The plate is composed of a mixture including 1,000 cubic centimeters by bulk volume of formed perlite particles each having a diameter of 0.1 to 7.0 millimeters 100 to 140 grams of cement, liquid rubber latex containing 5 to 20 grams of solid ingredients and a suitable amount of water and produced by press molding with a compression ratio of 1.10 to 1.30. The wall is constructed by assembling a number of the plates each provided with a side groove with the aid of supporting columns and reinforcing plates, each having a ridge adapted to be engaged with the side groove of the plate.

U.S. Pat. No. 4,207,964 to Taguchi discloses a sound absorbing and diffusing unit provided for assembling an acoustic screen which can be placed or hung in front of a wall inside an acoustic room for improving a sound-effect therein. These units are detachably joined together with each other so that they may be easily separated and assembled again to form an acoustic screen having another shape or construction to adjust or modulate a sound-effect. A sound absorbing porous panel having a desired picture or pattern can be easily hung against a wall. The decorative panel can be reversely hung on the wall to provide another interior ornamentation. Accordingly, an acoustically correct room and a desired ornamentation on a wall inside the acoustic room can be easily obtained and changed without providing a rigid reverberating surface of the room.

U.S. Pat. No. 4,248,325 to Georgopoulos discloses an improved sound absorptive tackable space dividing wall panel or similar article in which a wire mesh screen is disposed within the sound absorptive material a distance from the tackable surface less than the length of the tack pin, thereby providing additional support for the tackable load without appreciably reducing the sound absorptive characteristics of the panel.

U.S. Pat. No. 4,306,631 to Reusser discloses a noise barrier or other type wall or building assembly including a plurality of spans each extending between spaced apart posts and having top and bottom girt affixed to the posts and in turn supporting a plurality or series of vertically disposed panels. Unique mating interlock elements integrally formed along both lateral edges of the wall or building exterior panels allow the sequential interconnection of all panels in a series by means of a rotating displacement of the individual panels to yield multilateral interlocking of the panels. The panel faces are configured to provide shadow texture, while masking of the posts and top girt in a free-standing type wall is obtained by a split cover assembly and split cap trim, respectively.

U.S. Pat. No. 4,402,384 to Smith et al. discloses a sound barrier system particularly suited for out-of-doors, ground-mounted installations, such as for a highway noise barrier comprising a vertical wall composed of successive individual wall sections arranged with immediately adjacent wall sections disposed at an intersecting angle to each other. Immediately adjacent wall sections are rigidly joined together in abutment along a common vertical joint. An earth anchor is anchored into the ground at each vertical joint. Each joint is secured to the corresponding earth anchor so that downwardly directed hold-down forces are applied by the earth anchors to the wall at the bottom portions of the joints.

U.S. Pat. No. 4,605,090 to Melfi discloses a post and panel type noise barrier fence formed of a plurality of concrete vertical posts or columns which have grooves to hold flat concrete panels between successive ones of the columns. The panels can have a stepped lower edge to accommodate elevational changes in the terrain. Also, certain of the columns have oppositely disposed recesses angled from each other so as to accommodate directional changes at the columns in the direction of the barrier fence.

U.S. Pat. No. 4,607,466 to Allred discloses an acoustic panel having a porous layer and a generally rigid layer affixed to each other. The generally rigid layer includes at least one passageway opening on one side of the rigid layer and extending through the rigid layer to the porous layer. The porous layer is a fibrous material. The rigid layer is a concrete-type material, such as vermiculite-cement plaster. This acoustic panel further comprises a generally rigid planar surface positioned adjacent to the porous layer. This generally rigid planar surface can comprise an insulating layer affixed to the other side of the porous layer and a structural layer fastened to the insulating layer. The insulating layer is a polyurethane foam board. The structural layer is a particle board.

U.S. Pat. No. 4,805,734 to Mast discloses an acoustic wall for streets and parks and for garden-like designs consisting of several substantially U-shaped frame members arranged at a distance from one another, which frame members are connected among one another and have mats applied on their front and side surfaces. In order to substantially reduce the manufacture on location, the duration of setting up and the greening time on location, the acoustic wall consists of individual elements of which each has several U-shaped frame members which are secured at the ends of their long legs on a base. The base forms a rigid frame with fastening means for a lift for the lifting and transporting of the acoustic wall. One or several narrow-mesh mats are secured on the base, which mats prevent a failing out of material filled into the acoustic wall during transport.

U.S. Pat. No. 4,834,213 to Yamamoto et al. discloses a noise silencer for highways adapted to be stuffed in a joint gap formed in a highway. It has a rectangular casing and padding enclosed in the casing. The casing is provided with a vent hole adapted to be closed by a plug. Before mounting the noise silencer, air is firstly sucked out from the silencer through the vent hole to flatten the padding and the vent hole is plugged. After the silencer has been mounted, the vent hole is open to inflate the padding so that the silencer will be pressed against the opposite walls of the joint gap.

U.S. Pat. No. 5,217,771 to Schmanski et al. discloses a device for preventing the transmission of sound, the device being fabricated of polymer composition and comprising a hollow core member formed of fiber-reinforced thermosetting resin, and at least an outer member formed of unreinforced thermoplastic resin which is friction fit to the core member. The core member and outer members are preferably formed by pultrusion and extrusion, respectively. Adjacently disposed devices are connected together to form a fence-like barrier through which few or no sound waves are allowed to pass. This system is advantageously used to prevent sound waves emanating from a large transportation structure such as a highway, railroad track, or airport.

U.S. Pat. No. 5,272,284 to Schmanski discloses a sound wall for placement along a roadside for reducing the transmission of sound from a traffic area wherein the sound wall comprises a plurality of stiff, resilient containment members respectfully configured with the channel configuration and having an enclosed channel volume and continuous open side. Each channel volume is filled with a composite composition of rubber chips and binder compressed within the channel and substantially filling the channel volume. These containment members are stacked in nesting relationship to form a wall structure, with the open side being oriented toward the traffic area.

In my prior invention set forth in U.S. Pat. No. 7,063,184 issued Jun. 20, 2006, I disclosed an apparatus and method of making a sound reducing panel for use in an outdoor or a hazardous environment. This invention was widely accepted in the industry as a significant improvement in sound reduction.

In my prior invention set forth in U.S. Pat. No. 10,839,784 issued Nov. 17, 2020, I disclosed an improve sound reducing panel with an aerogel layer for decoupling for reducing sonic vibration and for insulating the sound blocking material from fire and excessive heat.

It is an object of the present invention to further improve upon my prior invention set forth in U.S. Pat. No. 10,839,784 that provide a sound reducing panel that adds a waterproof dimension to the improved sound reducing panel.

It is another object of the present invention to further improve upon my prior invention that provides a decorative appearance to the improved sound reducing panel.

Another object of this invention is to increase the sound reducing properties of the sound reducing panel without substantially increasing the cost of the sound reducing panel.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to a water resistant sound reducing panel comprising a front porous sheet for enabling sound to enter into the sound reducing panel and a rear non-porous sheet. A fiber glass fiber board sound absorbing member is located adjacent to the front porous sheet for dissipating sound entering into the front porous sheet. A sound blocking member comprises a sheet of polymeric material having a weight equal to or greater than one pound per square foot located adjacent to the sound absorbing member for blocking sound propagating through the sound absorbing member. An aerogel material decoupling member reduces sonic vibration from being transferred from the sound blocking member to the rear non-porous sheet. The sound blocking member is interposed between the fiber glass fiber board sound absorbing member and the aerogel material decoupling member for insulating the sound blocking member from fire or excessive heat. A drenching shield inhibits water from entering the water resistant sound absorbing member.

In a more specific example, the drenching shield comprises a sheet of waterproof material interposed between the front porous sheet and the water resistant sound absorbing member to inhibit water from entering the water resistant sound absorbing member from the front porous sheet.

Preferably, the drenching shield is a thin, flexible, waterproof acoustically transparent material and is fire rated and is ultra-violet tolerant. In one example, the drenching is a polyester film having a thickness of 12 microns (0.012 millimeters). In one example, the drenching shield is wrapped around the entire water resistant sound absorbing member and hermetically sealed about the water resistant sound absorbing member to prevents water from entering into the water resistant sound absorbing member.

The invention is also incorporated into a decorative sound reducing panel, comprising a front porous sheet for enabling sound to enter into the sound reducing panel and a rear non-porous sheet. A fiber glass fiber board sound absorbing member is located adjacent to the front porous sheet for dissipating sound entering into the front porous sheet. A sound blocking member comprises a sheet of polymeric material having a weight equal to or greater than one pound per square foot located adjacent to the sound absorbing member for blocking sound propagating through the sound absorbing member. An aerogel material decoupling member reduces sonic vibration from being transferred from the sound blocking member to the rear non-porous sheet. A decorative or artistic image is located on the sound reducing panel.

In a more specific example, the decorative or artistic image includes painting, airbrushing and the like. In the alternative, the decorative or artistic image is a porous sheet of flexible material with the decorative or artistic image preprinted thereon. Preferably, the acoustically transparent sheet is a perforated vinyl material enabling a high definition images to be printed on the vinyl material. In one example, the acoustically transparent sheet is retained in part by a frame. In another example, the acoustically transparent sheet is wrapped about the improved sound reducing panel including the front porous sheet as well as the frame and extending over at least a portion of the non-porous covering sheet.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 2 is an isometric view of the sound reducing panel of the prior art installed on a support in an outdoor or a hazardous environment;

FIG. 3 is an enlarged isometric view along line 3-3 in FIG. 2;

FIG. 10 is an enlarged sectional view along line 10-10 in FIG. 8;

FIG. 11 is an enlarged sectional view along line 11-11 in FIG. 8;

Similar reference characters refer to similar parts throughout the several Figures of the drawings.

DETAILED DISCUSSION

Figure 1:
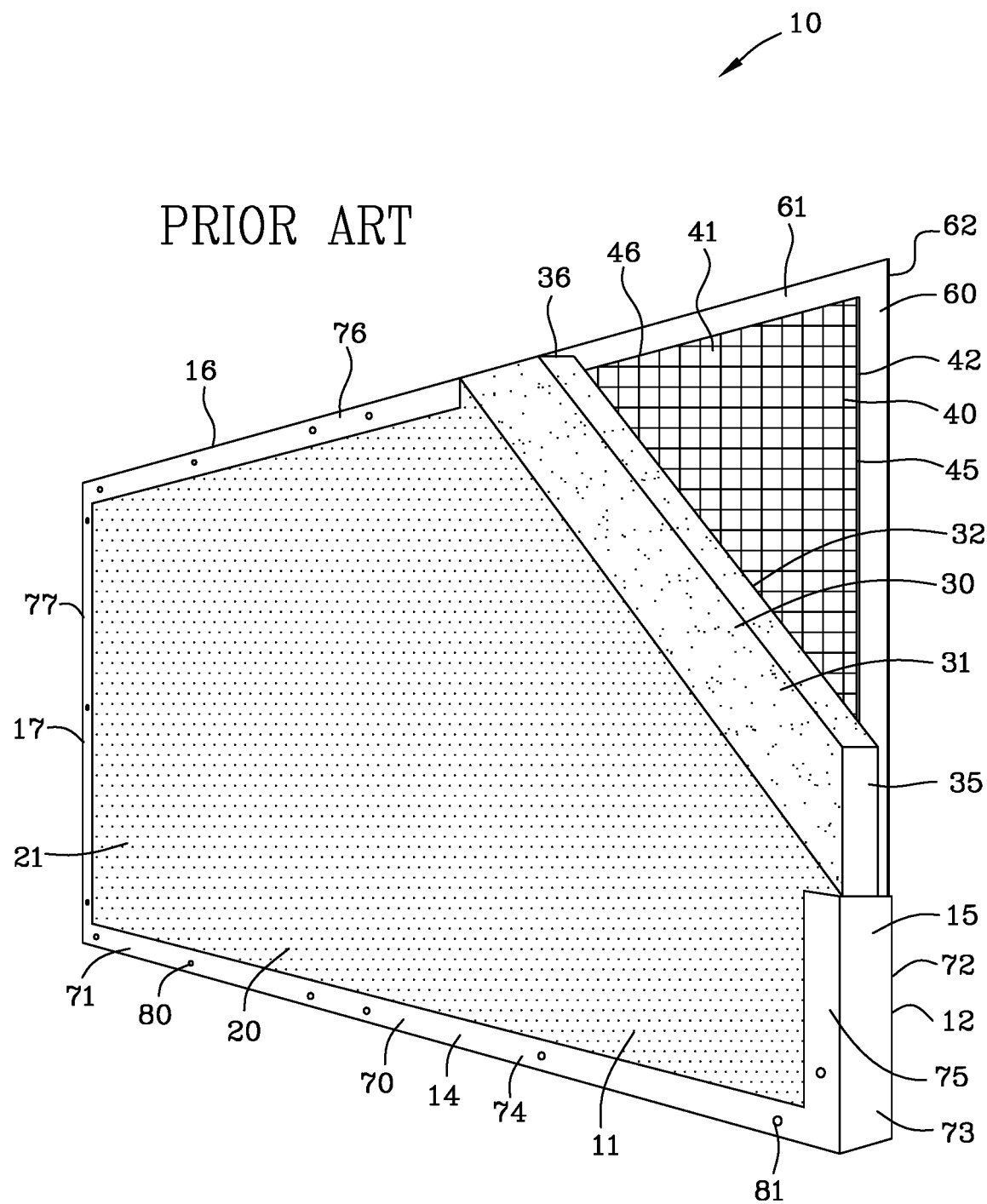
FIG. 1 is an isometric cut away view of my sound reducing panel of the prior art shown in U.S. Pat. No. 7,063,184.

FIGS. 1-5 are various views of a sound reducing panel 10 of the prior art shown in my U.S. Pat. No. 7,063,184 which is incorporated by reference as if fully set forth herein. The prior art sound reducing panel 10 comprises a front face surface 11 and a rear face surface 12 and a plurality of peripheral edges 14-17.

A porous covering sheet 20 comprises a first covering sheet face 21 and a second covering sheet face 22. The first covering sheet face 21 of the porous covering sheet 20 forms the front face surface 11 of the prior art sound reducing panel 10.

The prior art sound reducing panel 10 comprises a water resistant sound absorbing member 30. The water resistant sound absorbing member 30 comprises a first and a second face surface 31 and 32 and peripheral edges 34-37. The sound reducing panel 10 is formed from a multiplicity of fibers 38 defining a multiplicity of pores 39 between adjacent fibers 38.

The prior art sound reducing panel 10 includes a water resistant sound blocking member 40 for blocking the transmission of sound through the prior art sound reducing panel 10. The water resistant sound blocking member 40 comprises a first and a second face surface 41 and 42. The water resistant sound blocking member 40 is located adjacent to the water resistant sound absorbing member 30.

The water resistant sound absorbing member 30 enables sound entering the first face surface 31 of the sound absorbing member 30 to be absorbed and/or dissipated by the sound absorbing member 30. The water resistant sound blocking member 40 inhibits sound from exiting from the second face surface 32 of the sound absorbing member 30. The water resistant sound blocking member 40 inhibits sound from passing from the rear face surface 12 of the sound reducing panel 10.

A non-porous covering sheet 60 comprises a first covering sheet face 61 and a second covering sheet face 62. The first covering sheet face 61 of the non-porous covering sheet 60 is located adjacent to the second face surface 42 of the water resistant sound blocking member 40. The second covering sheet face 62 forms the rear face surface 12 of the prior art sound reducing panel 10.

The prior art sound reducing panel 10 includes a frame 70 is shown as a generally U-shape metallic member located about the porous covering sheet 20, the sound absorbing member 30, the sound blocking member 40 and the non-porous covering sheet 60. The U-shape metallic member 70 includes a first and a second leg 71 and 72 connected by an intermediate leg 73. The external frame 70 includes frame portions 74-77 which form the peripheral edges 14-17 of the sound reducing panel 10. The first and second legs 71 and 72 are disposed adjacent to the front face surface 11 and a rear face surface 12 of the sound reducing panel 10

Figure 4:
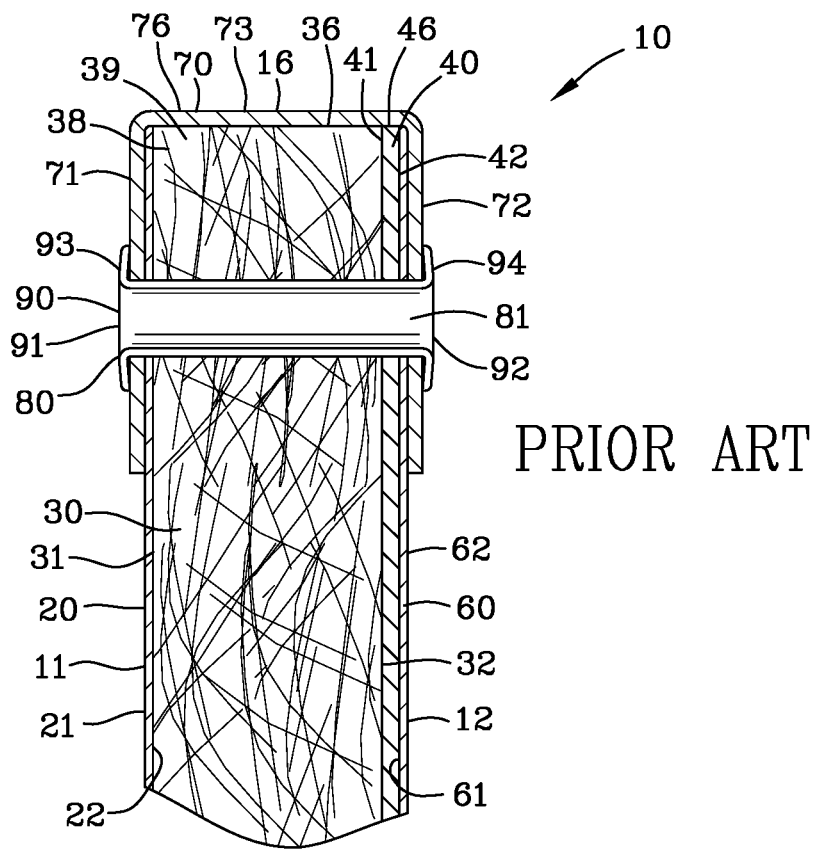
FIG. 4 is an enlarged sectional view along line 4-4 in FIG. 2 with the support being removed.
Figure 5:
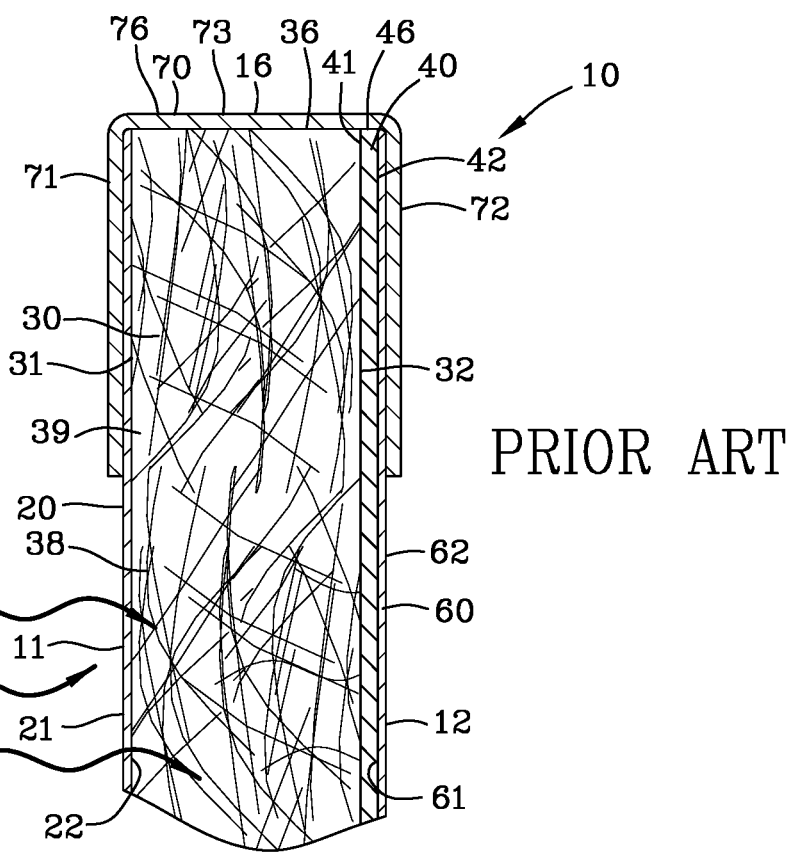
FIG. 5 is an enlarged sectional view along line 5-5 in FIG. 2 with the support being removed.

FIGS. 2-4 are enlarged views illustrating a mounting 80 for supporting the prior art sound reducing panel 10. The mounting 80 includes bores 81 extending through the frame portion 74-77. The bores 81 extend through the porous covering sheet 20, the sound absorbing member 30, the sound blocking member 40 and the non-porous covering sheet 60. A metallic sleeve 90 extends between a first and a second end 91 and 92 within each of the bores 81. The first and second ends 91 and 92 of the metallic sleeve 90 include flares 93 and 94 for engaging the first and second legs 71 and 72 of the frame 70.

FIGS. 2 and 3 illustrate the prior art sound reducing panel 10 secured by mounting fasteners 90 to a support 98 shown a chain link fence of conventional design. The mounting fasteners 95 extend through the bore 81 for mounting the prior art sound reducing panel 10 to the support 98. The mounting fasteners 90 are shown as wire, fiber or plastic fasteners for securing the prior art sound reducing panel 10 to the support 98.

Figure 6:
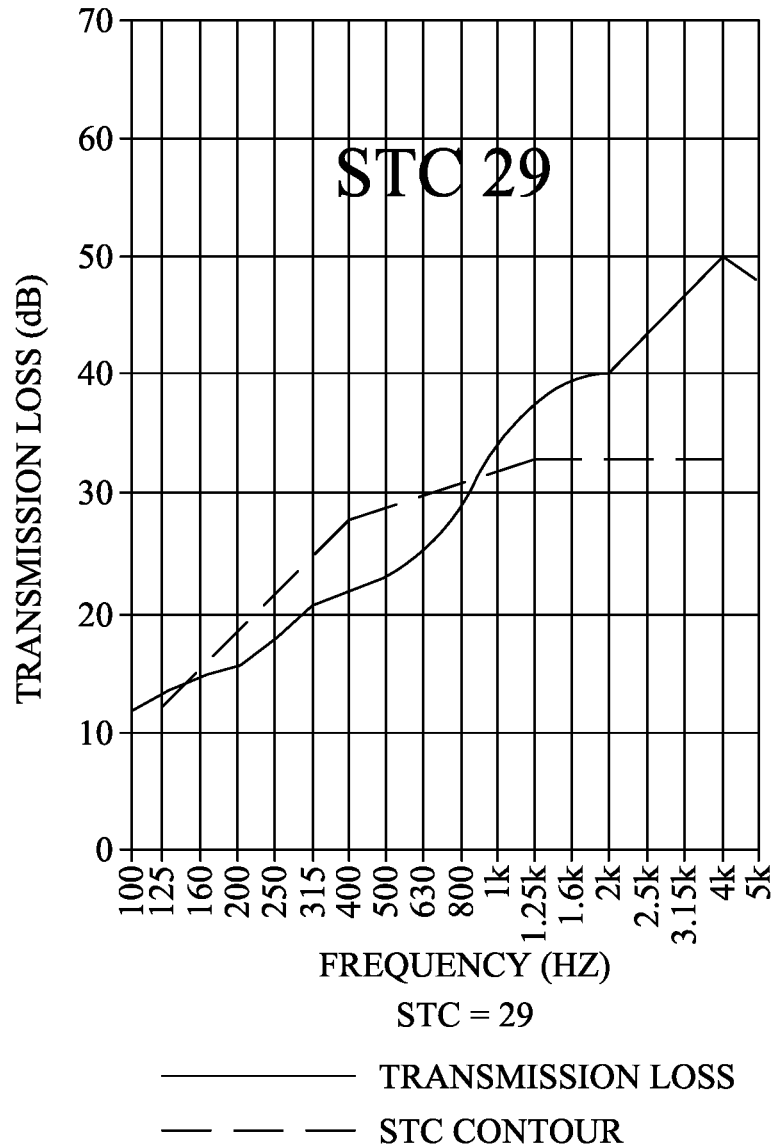
FIG. 6 is a graph of sound transmission report for the prior art sound reducing panel of FIGS. 1-5 illustrating the transmission loss as a function of frequency.
Figure 7:
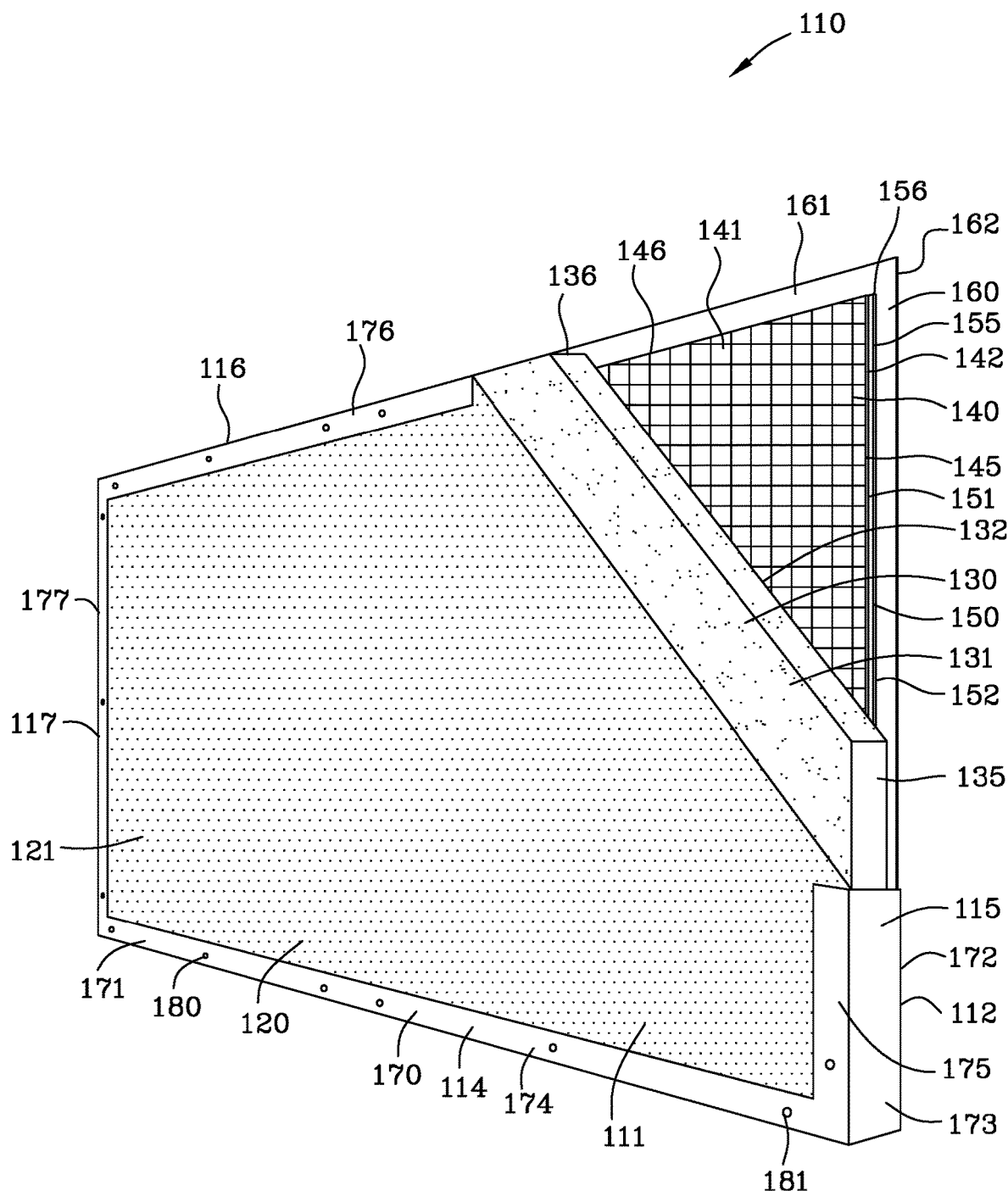
FIG. 7 is an isometric cut away view of a sound reducing panel of the prior art shown in my U.S. Pat. No. 10,839,784.
Figure 8:
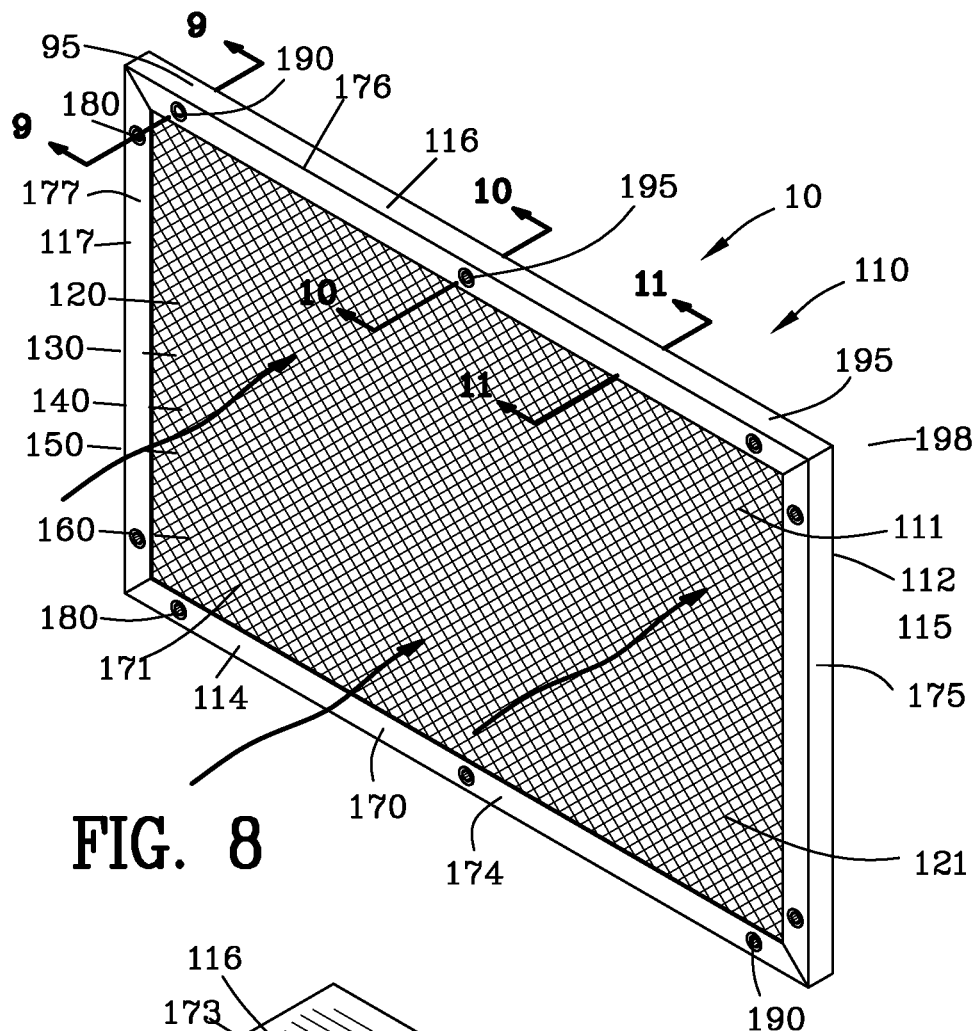
FIG. 8 is an isometric view of the sound reducing panel of FIG. 7.
Figure 9:
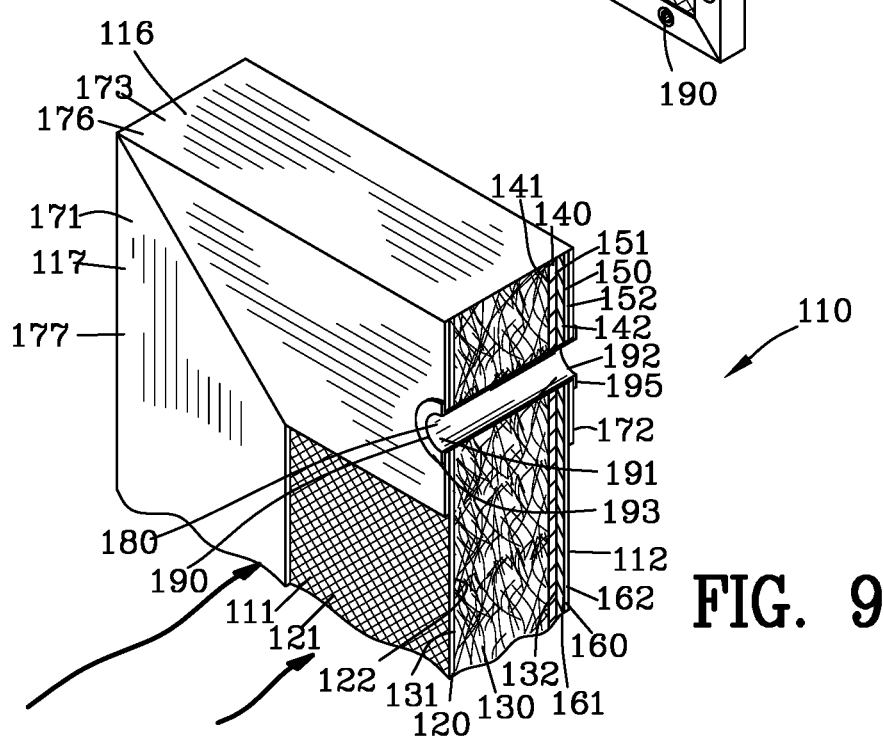
FIG. 9 is an enlarged isometric view along line 9-9 in FIG. 8.

FIG. 6 is a graph of sound transmission report for the prior art sound reducing panel 10 of FIGS. 1-5 illustrating the transmission loss as a function of frequency. The prior art sound reducing panel 10 provides an excellent sound transmission coefficient (STC) of 29. The prior art sound reducing panel 10 shows a reduction in transmission loss at lower frequencies.

FIGS. 7-11 illustrate the sound reducing panel 110 of my prior invention shown in U.S. Pat. No. 10,839,784 which is incorporated by reference as if fully set forth herein. The sound reducing panel 110 comprises a front face surface lll and a rear face surface 112 and a plurality of peripheral edges 114-117. Although the sound reducing panel 110 has been shown as having a rectangular configuration with four peripheral edges 114-117, it should be understood that the sound reducing panel 110 may have configurations different than a rectangular configuration.

The sound reducing panel 110 comprises a front porous sheet 120 for enabling sound to enter into said sound reducing panel. The porous covering sheet 120 defines a first covering sheet face 121 and a second covering sheet face 122. The first covering sheet face 121 of the porous covering sheet 120 forms the front face surface 111 of the sound reducing panel 110. In one example, the front porous sheet 120 comprises a metallic porous sheet.

A water resistant sound absorbing member 130 is located adjacent to said front porous sheet 120 for dissipating sound entering into the front porous sheet 120. The water resistant sound absorbing member 130 comprises a first and a second face surface 131 and 132 and peripheral edges 134-137. The first face surface 131 of the water resistant sound absorbing member 130 engages the second covering sheet face 122 of the porous covering sheet 120.

The sound reducing panel 110 is formed from a multiplicity of fibers 138 defining a multiplicity of pores 139 between adjacent fibers 138. The multiplicity of fibers 138 enables the sound and/or noise to enter through the multiplicity of pores 139 and to be dispersed by the multiplicity of fibers 138 within the water resistant sound absorbing member 130. In one example of the invention, the water resistant sound absorbing member 130 is formed from one to two inch thick fiber glass fiber board having a density of 6 pounds per square foot.

The sound reducing panel 110 includes a water resistant sound blocking member 140 for blocking the transmission of sound through the sound reducing panel 110. The water resistant sound blocking member 140 comprises a first and a second face surface 141 and 142.

The water resistant sound blocking member 140 is located adjacent to the water resistant sound absorbing member 130. Preferably, the first face surface 141 of water resistant sound blocking member 140 engages the second face surface 132 of the water resistant sound absorbing member 130

The water resistant sound blocking member 140 acts in concert with the water resistant sound absorbing member 130. The water resistant sound absorbing member 130 enables sound entering the first face surface 131 of the sound absorbing member 130 to be absorbed and/or dissipated by the sound absorbing member 130. The water resistant sound blocking member 130 inhibits sound from exiting from the second face surface 132 of the sound absorbing member 130. The water resistant sound blocking member 140 inhibits sound from passing from the rear face surface 112 of the sound reducing panel 110.

The water resistant sound blocking member 140 comprises a sheet of mineral filled vinyl polymeric material having a thickness of between $1/16$ of an inch and $1/4$ of an inch. Preferably, the water resistant sound blocking member 140 has a thickness of one-eighth of an inch and having a weight equal to or greater than one pound per square foot. A suitable material is sold under the Registered Trademark Acoustiblok by Acoustiblok, Inc. of Tampa, Fla. (www.acoustiblok.com).

An important aspect of the sound reducing panel 110 is the addition of a decoupling member 150. The decoupling member 150 comprises a first and a second face surface 151 and 152. The decoupling member 150 is interposed between the sound blocking member 140 and a non-porous covering sheet 160. The decoupling member 150 reduces sonic vibration from being transferred from the sound blocking member 140 to the rear non-porous sheet 160.

Preferably, the first face surface 151 of the decoupling member 150 engages the second face surface 142 of water resistant sound blocking member 140. The first face surface 151 of the decoupling member 150 engages a first covering sheet face 161 of the non-porous covering sheet 160. The second covering sheet face 162 of the non-porous covering sheet 160 forms the rear face surface 112 of the sound reducing panel 110. In one example, the rear non-porous sheet 160 comprises a metallic non-porous sheet.

The sound reducing panel 110 includes a frame 170 shown as a generally U-shape metallic member located about the porous covering sheet 120, the sound absorbing member 130, the sound blocking member 140, the decoupling member 150 and the non-porous covering sheet 160.

The U-shape metallic member of the frame 170 includes a first and a second leg 171 and 172 connected by an intermediate leg 173. The external frame 170 includes frame portions 174-77 which form the peripheral edges 114-117 of the sound reducing panel 110. The first and second legs 171 and 172 are disposed adjacent to the front face surface Ill and a rear face surface 112 of the sound reducing panel 110

A mounting 180 is provided for supporting the sound reducing panel 110. The mounting 180 includes bores 181 extending through the frame portion 174-177. The bores 181 extend through the porous covering sheet 120, the sound absorbing member 130, the sound blocking member 140, the decoupling member 150 and the non-porous covering sheet 160. A metallic sleeve 190 extends between a first and a second end 191 and 192 within each of the bores 181. The first and second ends 191 and 192 of the metallic sleeve 190 include flares 193 and 194 for engaging the first and second legs 171 and 172 of the frame 170. A fastener as shown in FIGS. 2 and 3 mounts the sound reducing panel 110 to a support (not shown). It should be appreciated that numerous other ways and methods may be used for supporting and or hanging or otherwise spending the sound reducing panel 110 within an environment. The sound reducing panel 110 is suitable for use in an outdoor, hazardous environment or manufacturing environment.

Typically, sonic decoupling is achieved by spacing a first member from a second member with an air gap located therebetween. The air gap between the first member and second member impedes the transfer of vibration from the first member to the second member. Unfortunately, an air gap was not a solution for the decoupling member 150 due to the engagement of the porous covering sheet 120, the sound absorbing member 130, the sound blocking member 140, the decoupling member 150 and the non-porous covering sheet 160.

The solution to this problem was found through the use of an aerogel material for the decoupling material 150. The aerogel material is a light weight, slightly compressible material with extraordinary thermal blocking properties.

The decoupling material 150 comprises a sheet of aerogel material having a thickness of between $1/16$ of an inch and $3/8$ of an inch. Preferably, the decoupling material 150 comprises a sheet of aerogel material having a thickness of 0.125 inch having a density of 10 pounds per cubic foot. A highly incompressible aerogel material that is suitable for use as the decoupling material 150 is available at Thermablok LLC of Tampa, Florida. (www.acoustiblok.com).

It has been found that the inclusion of the 0.125 inch thickness of aerogel material as the decoupling material 150 substantially reduces sound transmission between the sound blocking member 140 and the non-porous covering sheet 160. Furthermore, the inclusion of the aerogel material as the decoupling material 150 does not appreciably increase the weight or the cost of the sound reducing panel 10.

Preferably, the sound reducing panel 110 comprises a metallic porous covering sheet 120, a fiber glass fiber board sound absorbing member 130, a mineral filled vinyl polymeric sound blocking member 140, an aerogel decoupling member 150 and the non-porous metallic covering sheet 160 enclosed by a metallic frame 170. The mineral filled vinyl polymeric sound blocking member 140 represents the greatest source of smoke in the event the sound reducing panel 110 is subjected to a fire or excessive heat.

The inclusion of the aerogel decoupling member 150 acts in concert with the fiber glass fiber board sound absorbing member 130 to insulate the mineral filled vinyl polymeric sound blocking member 140 from fire or excessive heat. The metallic porous covering sheet 120 and the non-porous metallic covering sheet 160 enclosed by the metallic frame 170 further protects the mineral filled vinyl polymeric sound blocking member 140. Flame tests will be conducted on the sound reducing panel 110 in the near future. It is expected that the inclusion of the aerogel decoupling member 150 will significantly reduce the smoke developed by the sound reducing panel 110 relative to the prior art sound reducing panel 10 at the same temperature.

Figure 12:
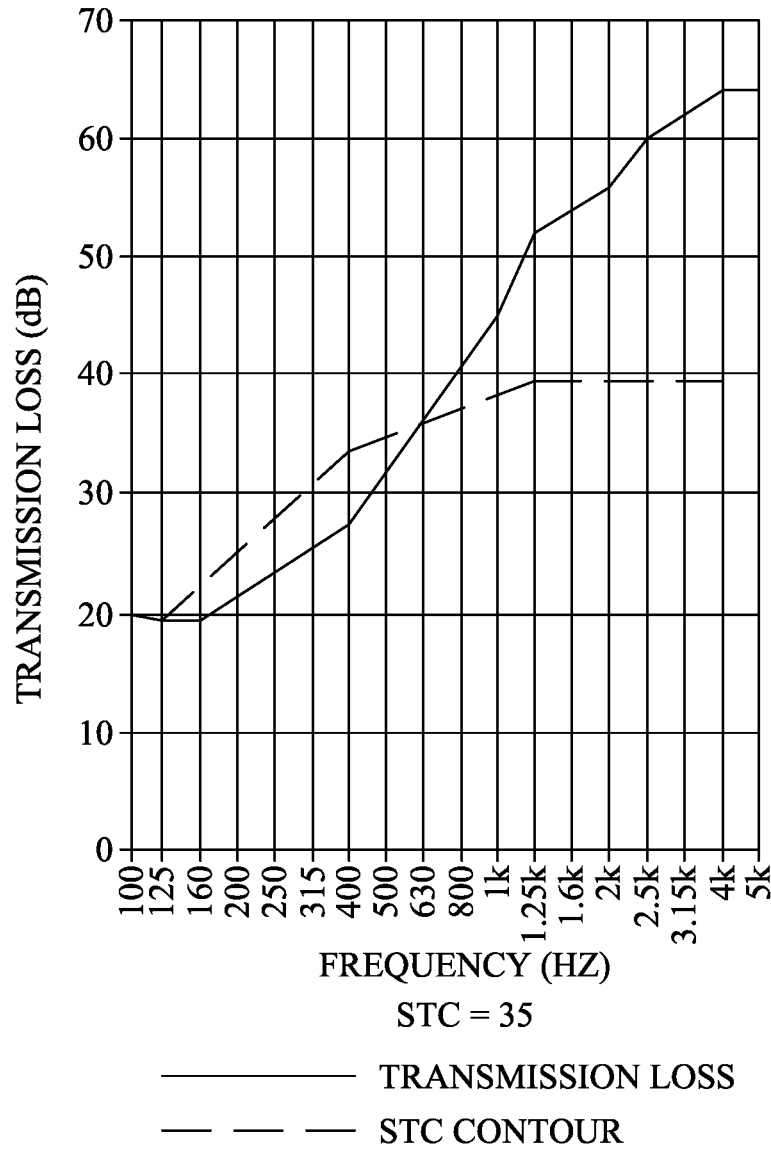
FIG. 12 is a graph of a sound transmission report for the art sound reducing panel of FIGS. 7-11 illustrating the transmission loss as a function of frequency.

FIG. 12 is a graph of sound transmission report for the sound reducing panel 110 of FIGS. 7-11 illustrating the transmission loss as a function of frequency. The sound reducing panel 110 provides a sound transmission coefficient (STC) of 35 over the excellent sound transmission coefficient (STC) of 29 of the prior art sound reducing panel 10.

This difference of 6 db of the sound reducing panel 110 represents a 34% difference in the average STC over the sound transmission coefficient (STC) of 29 of the prior art sound reducing panel 10. Furthermore, a comparison of FIGS. 6 and 12 illustrates an extraordinary improvement (8 db) in the very low frequencies of the sound reducing panel 110 which are exceptionally more difficult to control.

For example, this eight db in the 100 Hz frequency range represents over 40% improvement to the human ear. A comparison of FIGS. 6 and 12 also indicates as much as a 20 db improvement in the higher frequency of 5,000 Hz. A 20 db difference represents approximately a 75% improvement to the human ear.

The sound reducing panel 110 of the present invention provides a significant improvement over my prior art sound reducing panel 10 illustrated in U.S. Pat. No. 7,063,184. The sound reducing panel 110 provides a sound transmission coefficient (STC) of 35 over the sound transmission coefficient (STC) of 29 of the prior art sound reducing panel 10. The increased sound reducing properties of the sound reducing panel 110 in achieved without substantially increasing the weight or size of the sound reducing panel. The sound reducing panel 110 is believed to be more fire or smoke resistant over the prior art sound reducing panel 10. The above advantages have been obtained without substantially increasing the cost of the sound reducing panel.

Figure 13:
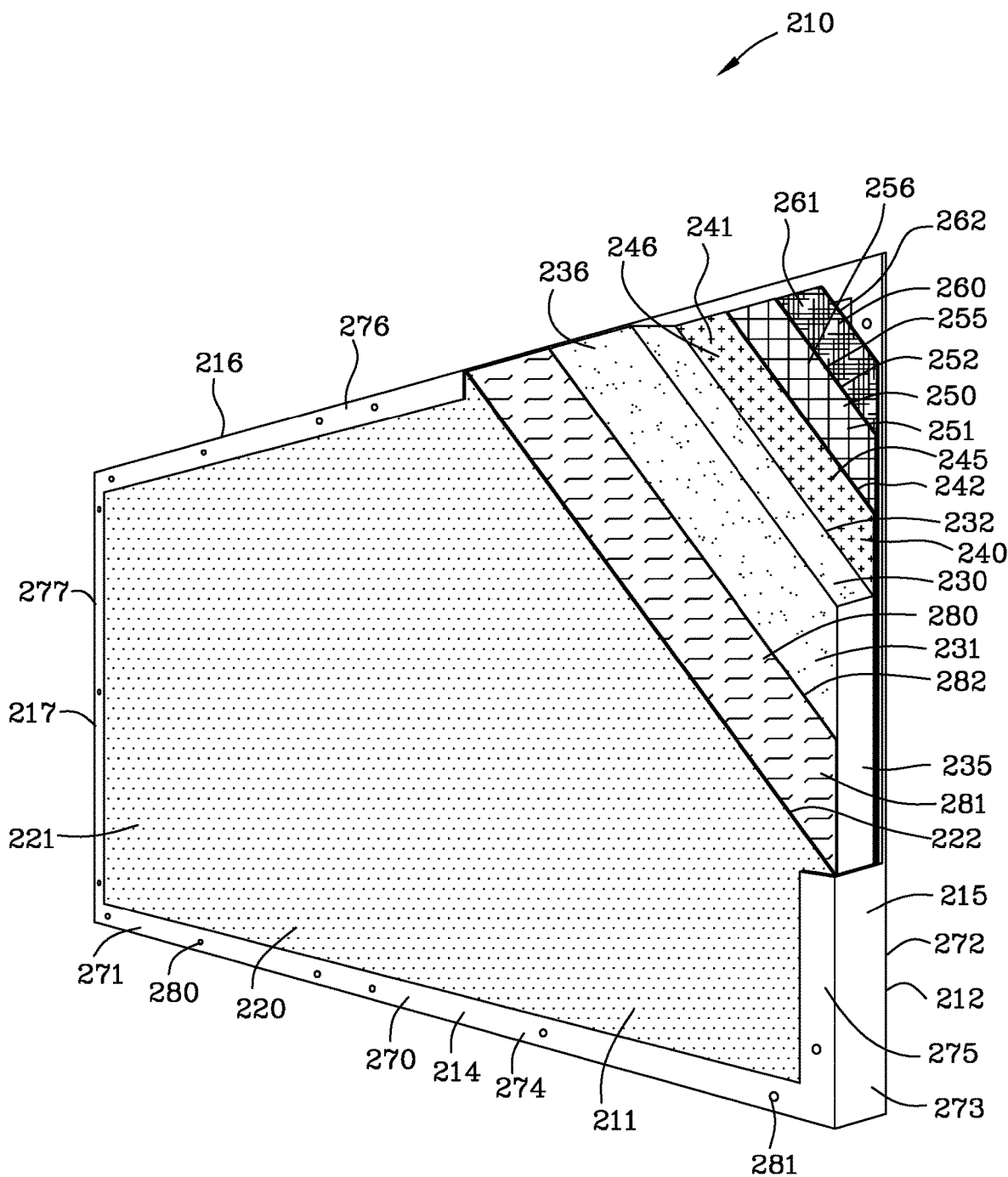
FIG. 13 is an isometric cut away view of an improved water resistant sound reducing panel of the present invention.
Figure 14:
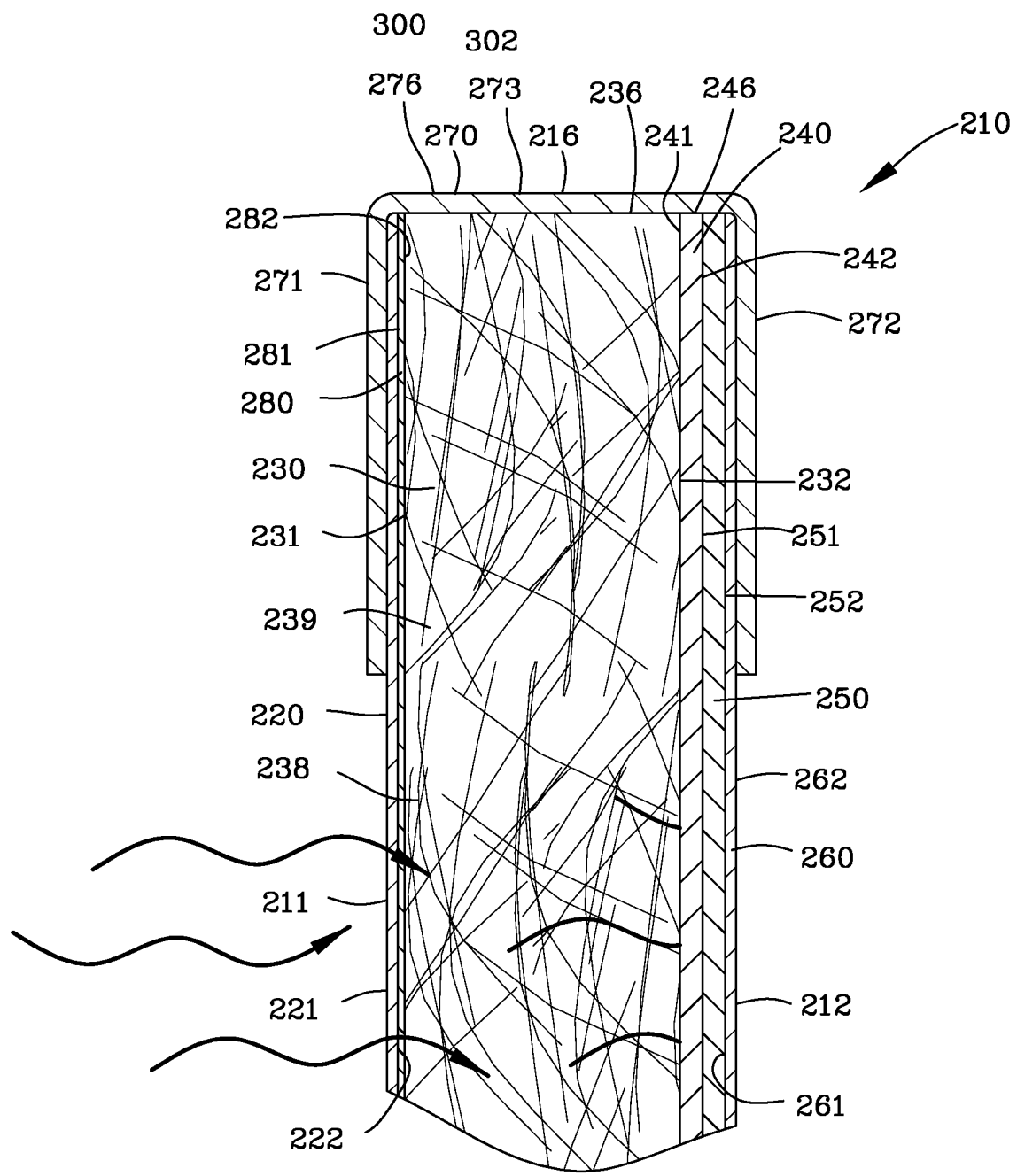
FIG. 14 is an enlarged sectional view of FIG. 13.

FIGS. 13 and 14 illustrate a first embodiment of an improved sound reducing panel 210 of my prior invention shown in U.S. Pat. No. 10,839,784 which is incorporated by reference as if fully set forth herein. The improved sound reducing panel 210 is similar to the sound reducing panel 110 set forth in FIGS. 7-11 with similar parts being labeled with similar reference numerals raised by 100.

The sound reducing panel 210 comprises a front face surface 211 and a rear face surface 212 and a plurality of peripheral edges 214-217. A front porous sheet 220 comprises a first covering sheet face 221 and a second covering sheet face 222 with the first covering sheet face 221 enabling sound to enter into said sound reducing panel 210. The first covering sheet face 221 of the porous covering sheet 220 forms the front face surface 211 of the sound reducing panel 210.

A water resistant sound absorbing member 230 comprises a first and a second face surface 231 and 232 and peripheral edges. The water resistant sound absorbing member 230 may be formed from a fiber glass fiber board or woven materiel or any similar type material. The sound reducing panel 210 is formed from a multiplicity of fibers 238 defining a multiplicity of pores 239 between adjacent fibers 238 enabling the sound and/or noise to enter through the multiplicity of pores 239 and to be dispersed by the multiplicity of fibers 238.

A water resistant sound blocking member 240 comprises a first and a second face surface 241 and 242 for blocking the transmission of sound through the sound reducing panel 210. The water resistant sound blocking member 240 acts in concert with the water resistant sound absorbing member 230 as described previously with respect to FIGS. 7-11.

A decoupling member 250 comprises a first and a second face surface 251 and 252. The decoupling member 250 is interposed between the sound blocking member 240 and a non-porous covering sheet 260. The first face surface 251 of the decoupling member 250 engages the second face surface 242 of the water resistant sound blocking member 240. The second face surface 252 of the decoupling member 250 engages the non-porous covering sheet 260. The decoupling member 250 reduces sonic vibration from being transferred from the sound blocking member 240 to the rear non-porous sheet 260.

A frame 270 is shown as a generally U-shape metallic member located about the porous covering sheet 220, the sound absorbing member 230, the sound blocking member 240, the decoupling member 250 and the non-porous covering sheet 260.

The drenching shield 280 comprises a sheet of waterproof material. The drenching shield 280 comprises an outer drenching shield surface 281 and an inner drenching shield surface 282 and peripheral edges. The drenching shield 280 is a thin, flexible, waterproof acoustically transparent material. Preferably, the drenching shield 280 is fire rated and is ultra-violet tolerant.

A polyester film having a thickness of 12 microns (0.012 millimeters) has been found to be sufficiently flexible to transfer acoustical energy between the outer drenching shield surface 281 and the inner drenching shield surface 282. The thinness and the flexibility of the drenching shield 280 enables the drenching shield 280 to function as a wave transfer member for transferring acoustical waves while providing a water barrier between the outer drenching shield surface 281 and the inner drenching shield surface 282.

FIGS. 13 and 14 illustrates the drenching shield 280 interposed between the front porous sheet 220 and the water resistant sound absorbing member 230. The outer drenching shield surface 281 is located adjacent to the second covering sheet face 222 whereas the inner drenching shield surface 282 is located adjacent to the first face surface 231 of the water resistant sound absorbing member 230. The drenching shield 280 resists water from entering the multiplicity of pores 239 between adjacent fibers 238 of the water resistant sound absorbing member 230 from the front porous sheet 220.

Figure 15:
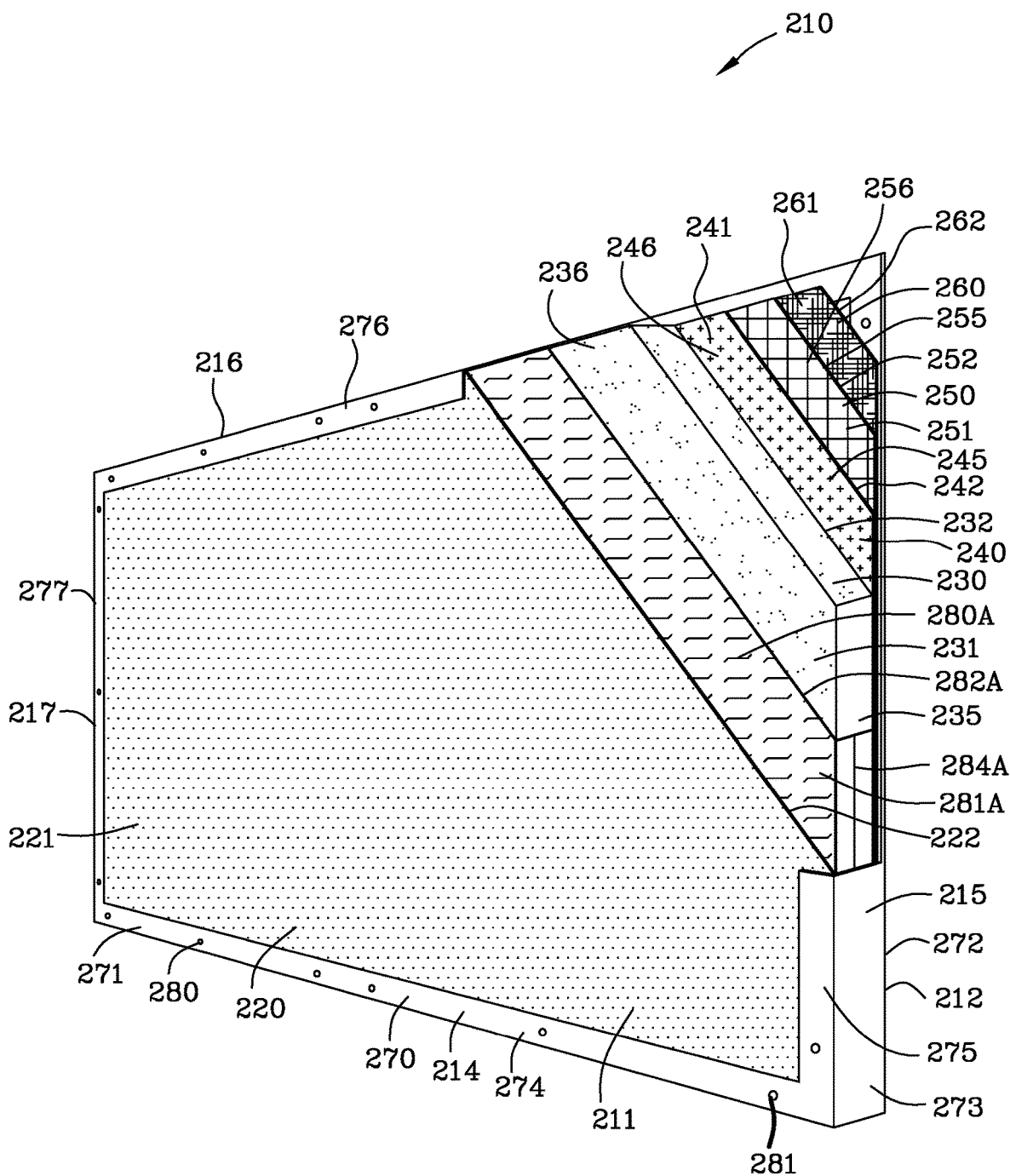
FIG. 15 is an isometric cut away view of an alternative improved water resistant sound reducing panel of the present invention.
Figure 16:
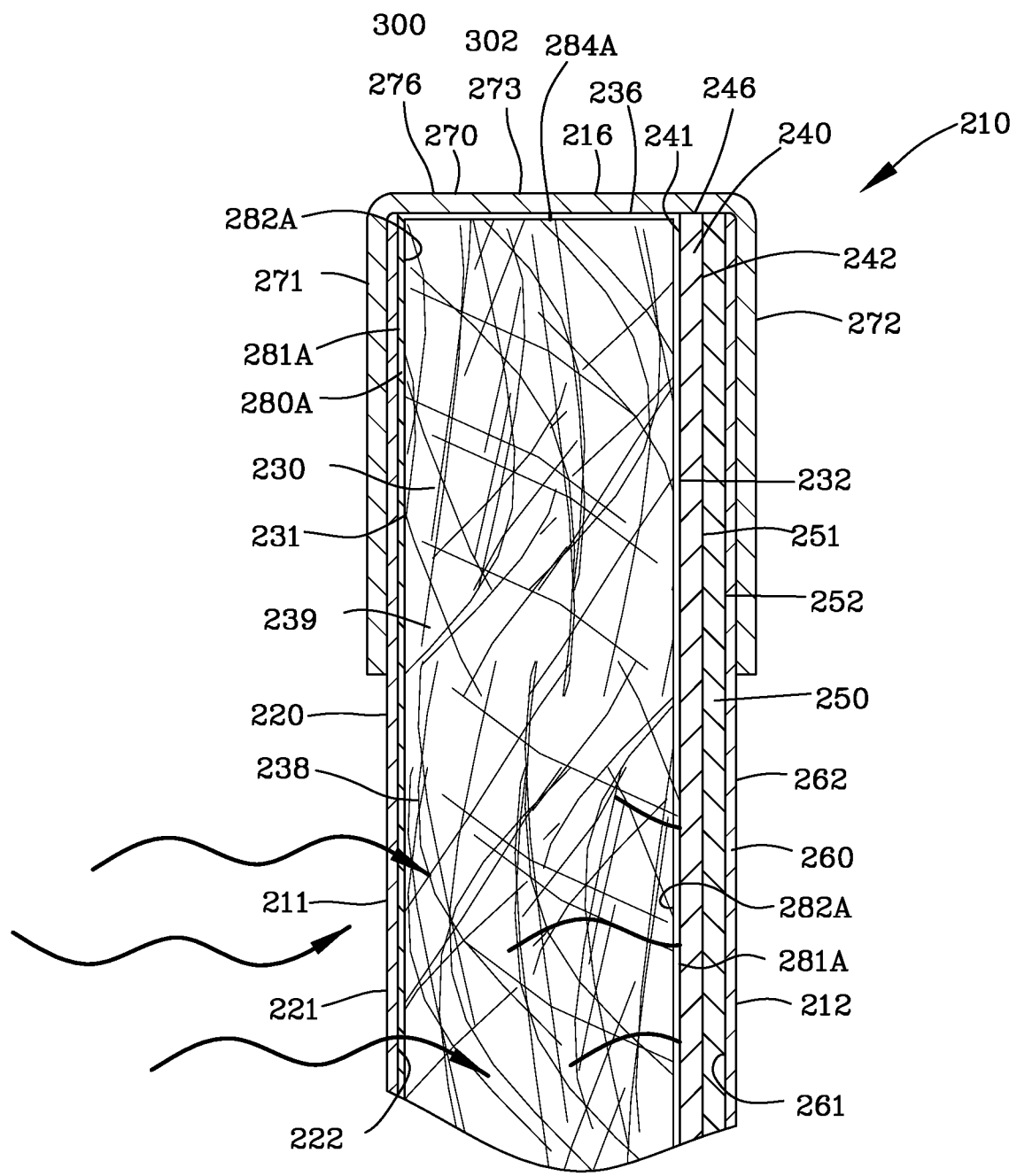
FIG. 16 is an enlarged sectional view of FIG. 15.

FIGS. 15 and 16 illustrate a variation of the drenching shield 280 shown in FIGS. 13 and 14. In this embodiment, the drenching shield 280A comprises an outer drenching shield surface 281A and an inner drenching shield surface 282A and peripheral edges. The drenching shield 280A is wrapped around the entire water resistant sound absorbing member 230 with the inner drenching shield surface 282A being adjacent to the water resistant sound absorbing member 230 and with the outer drenching shield surface 281A being adjacent to the front porous sheet 220 and the water resistant sound blocking member 240. The drenching shield 280A is hermetically sealed 284A about the peripheral edges of the water resistant sound absorbing member 230. The drenching shield 280A prevents water from entering the multiplicity of pores 239 between adjacent fibers 238 of the water resistant sound absorbing member 230.

Figure 17:
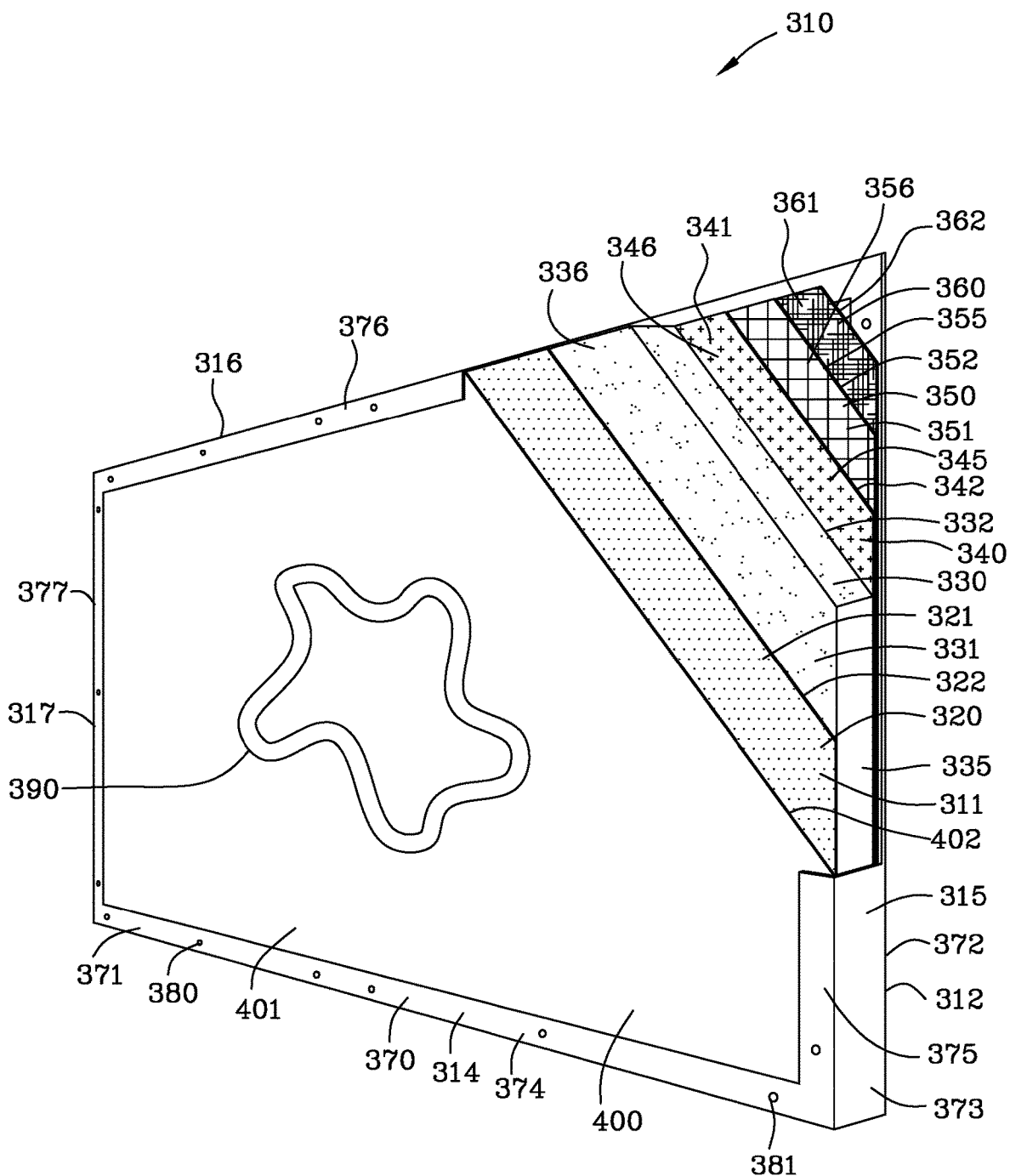
FIG. 17 is an isometric cut away view of an improved decorative sound reducing panel of the present invention.
Figure 18:
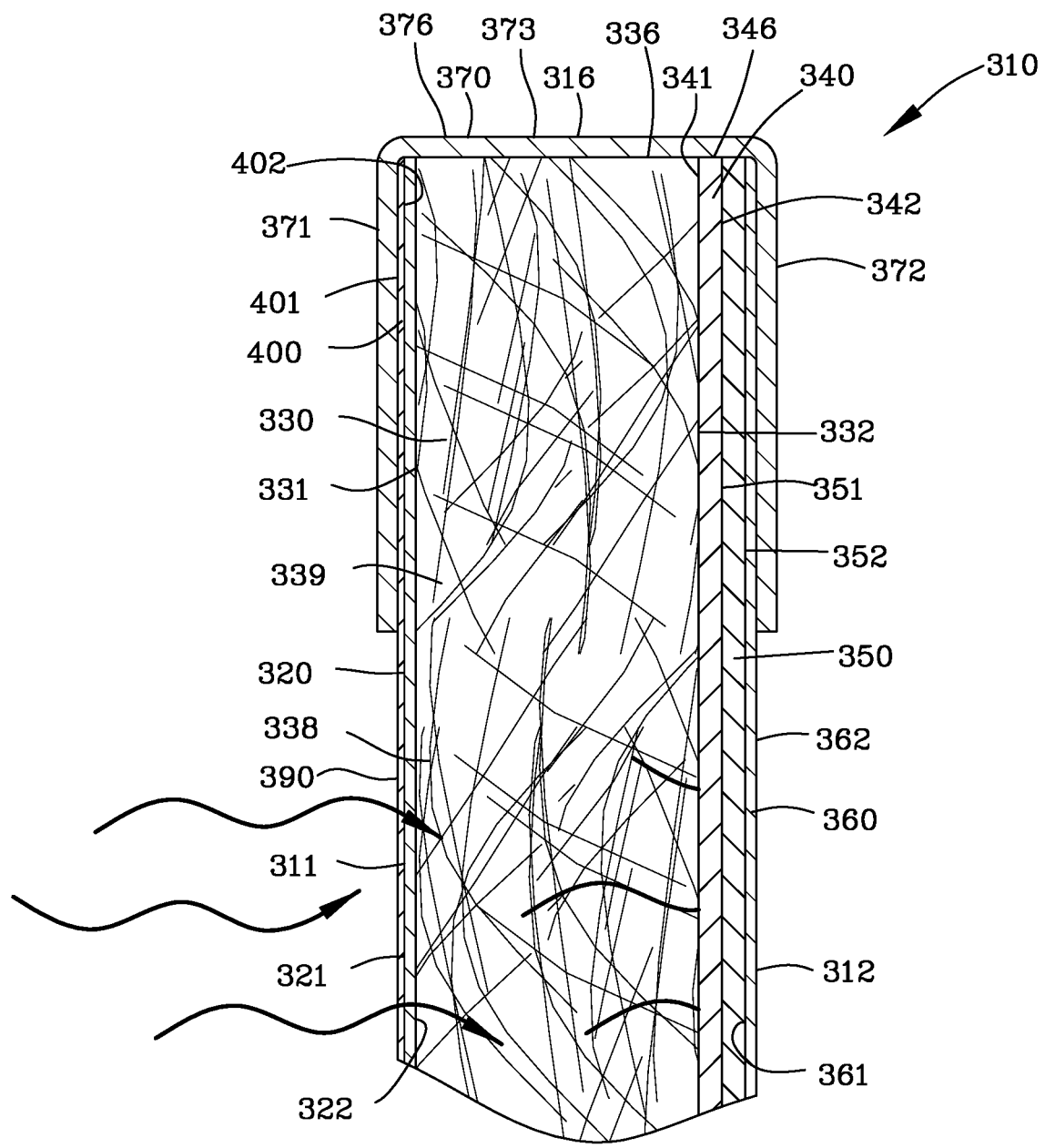
FIG. 18 is an enlarged sectional view of FIG. 17.

FIGS. 17 and 18 illustrate a second embodiment of an improved sound reducing panel 310 of my prior invention shown in U.S. Pat. No. 10,839,784 which is incorporated by reference as if fully set forth herein. The improved sound reducing panel 310 is similar to the sound reducing panel 110 set forth in FIGS. 7-11 with similar parts being labeled with similar reference numerals raised by 200.

In this embodiment, the front porous sheet 320 is covered with a decorative or artistic image 390. The decorative or artistic image 390 provides an opportunity to install the improved sound reducing panel 310 in locations previously unavailable and/or undesirable. For example, the decorative or artistic image 390 may be installed in nonindustrial locations such as restaurants, offices, homes, museums in contrast to typical industrial installations.

The decorative or artistic image 390 may be installed on the improved sound reducing panel 310 in various manners including painting, airbrushing and the like. One particular method of applying a decorative or artistic image 390 the front porous sheet is to apply a porous sheet of flexible material with a decorative or artistic image 390 preprinted thereon.

FIGS. 17 and 18 illustrate a very thin acoustically transparent sheet 400 having an outer surface 401 and an inner surface 402. The decorative or artistic image 390 is preprinted onto the outer surface 401 of the acoustically transparent sheet 400. The acoustically transparent sheet 400 is perforated for enabling acoustical waves to pass therethrough.

One suitable material for the acoustically transparent sheet 400 is a perforated vinyl material similar to the 3M Corporation auto wrap. The perforated vinyl material enables high definition images to be printed on the vinyl material. The images may be computer generated or may be high definition photographs of actual place of items.

FIGS. 17 and 18 illustrate the acoustically transparent sheet 400 mounted on the front porous sheet 320 with the inner surface 402 of the acoustically transparent sheet 400 adjacent to the first covering sheet face 221 of the front porous sheet 220. The outer surface 401 of the acoustically transparent sheet 400 having the decorative or artistic image 390 exposed to the environment. The acoustically transparent sheet 400 is retained in part by a frame 370.

Figure 19:
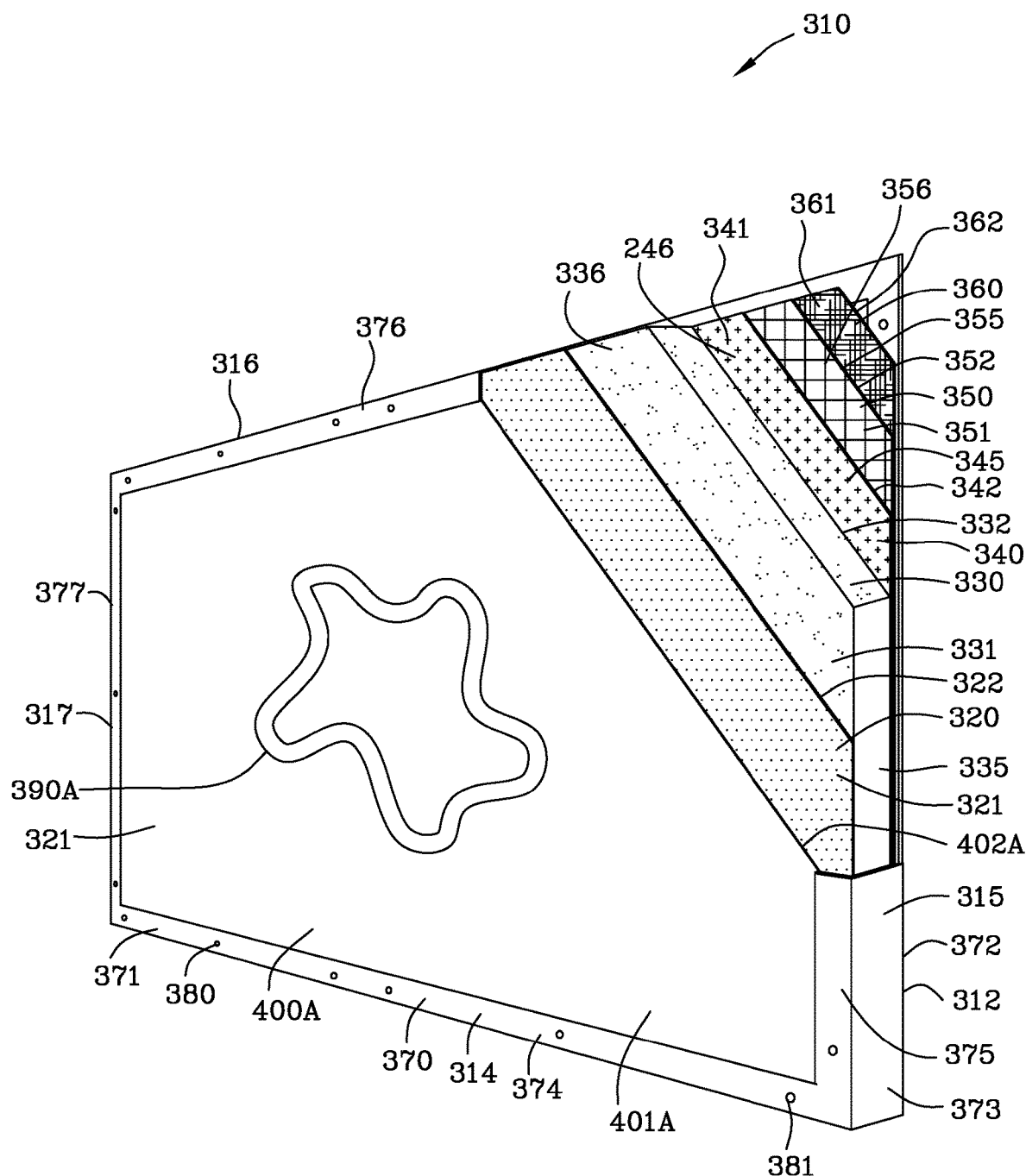
FIG. 19 is an isometric cut away view of an alternative improved decorative sound reducing panel of the present invention.
Figure 20:
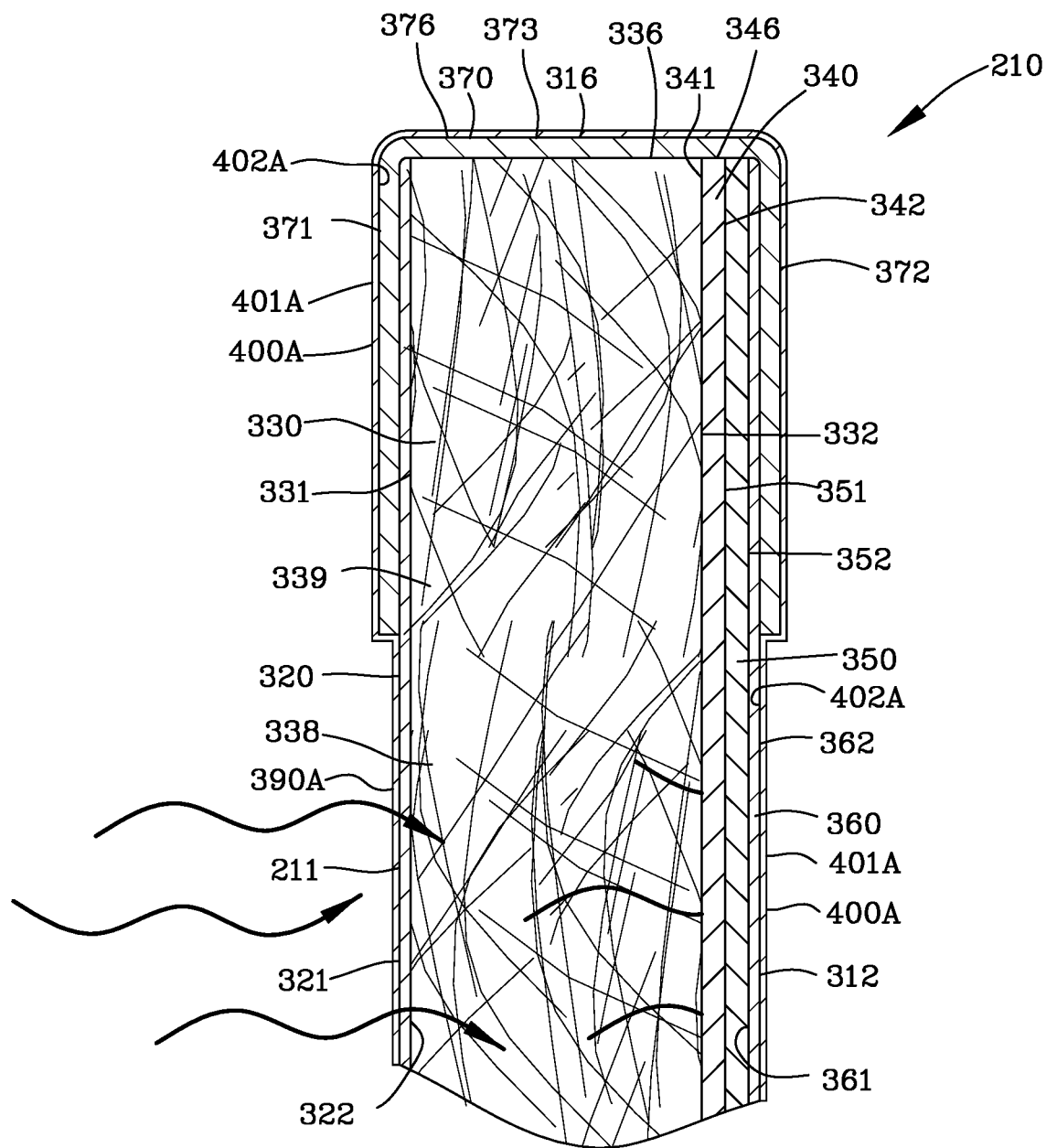
FIG. 20 is an enlarged sectional view of FIG. 19.

FIGS. 19 and 20 illustrate a variation of decorative or artistic image 390A shown in FIGS. 17 and 18. In this embodiment, a very thin acoustically transparent sheet 400A having an outer surface 401A and an inner surface 402A is wrapped about the improved sound reducing panel 310A. The decorative or artistic image 390A is preprinted onto the outer surface 401A of the acoustically transparent sheet 400A.

The acoustically transparent sheet 400A is wrapped about the improved sound reducing panel 310A including the front porous sheet 320 as well as the frame 370 and extending over at least a portion of the non-porous covering sheet 360.

The present invention to improve upon my prior invention set forth in U.S. Pat. No. 10,839,784 by providing a waterproof dimension to my prior sound reducing panel. The present invention also provides a decorative appearance without substantially increasing the cost of the sound reducing panel. In addition, the drenching shield and/or the acoustically transparent sheet extends the use of the sound reducing panel in hazardous such as dusty environments as well as use in clean environments such as clean rooms and the like.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A decorative sound reducing panel, comprising:
a front porous sheet for enabling sound to enter into said sound reducing panel;
a rear non-porous sheet;
a sound absorbing member located adjacent to said front porous sheet for dissipating sound entering into said front porous sheet;
a sound blocking member comprising a sheet of polymeric material having a weight equal to or greater than one pound per square foot located adjacent to said sound absorbing member for blocking sound propagating through said sound absorbing member;
an aerogel material decoupling member for reducing sonic vibration from being transferred from said sound blocking member to said rear non-porous sheet;
said sound blocking member being interposed between said sound absorbing member and said aerogel material decoupling member for insulating said sound blocking member from fire or excessive heat; and
a decorative or artistic image located on said sound reducing panel.

2. A decorative sound reducing panel as set forth in claim 1, wherein said decorative or artistic image includes painting, airbrushing and the like.

3. A decorative sound reducing panel as set forth in claim 1, wherein said decorative or artistic image is a porous flexible acoustically transparent sheet with said decorative or artistic image preprinted thereon.

4. A decorative sound reducing panel as set forth in claim 3, wherein said acoustically transparent sheet is a perforated vinyl material enabling a high definition image to be printed on said vinyl material.

5. A decorative sound reducing panel as set forth in claim 3, wherein said acoustically transparent sheet is retained in part by a frame supporting the decorative sound reducing panel.

6. A decorative sound reducing panel as set forth in claim 5, wherein said acoustically transparent sheet is wrapped about said sound reducing panel including said front porous sheet as well as said frame and extending over at least a portion of said non-porous covering sheet.

* * * * *